United States Patent [19]

Edwards

[11] 4,415,171
[45] Nov. 15, 1983

[54] CONTROL SYSTEM AND SHAFT SEAL FOR STIRLING CYCLE MACHINE

[76] Inventor: Linton A. Edwards, 13610 SE. Foster Rd., Portland, Oreg. 97236

[21] Appl. No.: 260,822

[22] Filed: May 5, 1981

[51] Int. Cl.³ .......................... F16J 15/02; F02G 1/00
[52] U.S. Cl. ...................................... 277/12; 277/53; 60/517; 74/18.2
[58] Field of Search .............. 277/12, 53, 101, 212 R, 277/212 F; 60/517; 74/18.2

[56] References Cited

U.S. PATENT DOCUMENTS

| | | | |
|---|---|---|---|
| 3,254,153 | 5/1966 | Kohler | 277/101 |
| 3,460,344 | 8/1969 | Johnson | |
| 3,698,182 | 10/1972 | Knoos | |
| 3,848,877 | 11/1974 | Bengtsson | 60/517 |
| 3,861,503 | 1/1975 | Nash | 277/212 R |
| 3,953,037 | 4/1976 | Winfield | 74/18.2 |
| 4,093,239 | 6/1978 | Sugahara | 60/517 |
| 4,211,423 | 7/1980 | Resech | 277/12 |
| 4,279,426 | 7/1981 | Flack | 277/12 |
| 4,295,653 | 10/1981 | Coles | 74/18.2 |
| 4,335,884 | 6/1982 | Darche | 60/517 |

Primary Examiner—Robert I. Smith
Attorney, Agent, or Firm—Chernoff, Vilhauer, McClung, Birdwell, & Stinzel

[57] ABSTRACT

A Stirling cycle engine has power pistons disposed in power cylinders. Each power piston is interconnected by levers fixed on an oscillating shaft to a unidirectionally rotating output crank shaft. Reciprocating displacers are disposed in displacer cylinders separate from the power cylinders, to move the working fluid alternatingly from hot to cold ends of a heat exchanger unit associated with each power piston and cylinder. Variably positionable linkages driven by the power pistons control the length of stroke of reciprocating displacers to control the power output of the engine. Seals associated with rotationally oscillating shafts include spacers to support a flexible sleeve against the force of pressurized gases within the engine casing.

2 Claims, 19 Drawing Figures

CONTROL SYSTEM AND SHAFT SEAL FOR STIRLING CYCLE MACHINE

BACKGROUND OF THE INVENTION

The present invention relates to Stirling cycle hot gas engines and particularly to Stirling cycle engines capable of operating reversibly.

Previously known Stirling cycle engines of the type including a displacer to move the working fluid through a heat exchanger unit, such as those disclosed in Johnson U.S. Pat. No. 3,460,344 and Knoos U.S. Pat. No. 3,698,182, have utilized fixed relationships between the motion of the displacer and the motion of the power piston. The amount of power output has been controlled by the variation of the amount of heat supplied to the working fluid, and by the variation of the amount of dead space, the volume within the system which is not swept by the movement of the pistons and displacers.

Knoos discusses the use of plenums to vary the amount of dead space, while Johnson disclosed a chamber having a variable volume used to accomplish the same purpose. While the engines disclosed by Knoos and Johnson can thus respond quickly to changes in load or desired changes of speed, the engines are unidirectional and reversal of the direction of rotation of an output shaft must therefore be accomplished by means external of the engine, such as by changing gear relationships.

Another problem inherent in engines of this type is that the high pressure at which the working fluid is commonly maintained causes a great deal of difficulty in sealing openings in the engine casing through which shafts extend, to prevent loss of the working fluid into the surrounding atmosphere. The working fluid is commonly a nonatmospheric gas having desired thermodynamic properties and must be retained to maintain efficiency of the machine.

What is needed, therefore, is an improved system for controlling the operation of a Stirling cycle engine to provide reversability and improved responsiveness to changes in the desired power output of the engine, and an improved type of seal for use where a shaft, particularly an oscillating shaft, extends through the casing wall of such an engine.

SUMMARY OF THE INVENTION

The aforementioned needs for reversibility, improved responsiveness, and improved shaft seals in a Stirling cycle engine are met in the present invention by the provision of a Stirling cycle engine having only oscillatingly rotating shafts within the pressurized portion of the engine. Variable linkage is provided for connecting each power piston with its associated displacers, and are improved shaft seal is provided to tightly enclose the working fluid within the engine casing at locations where an oscillating shaft extends through a wall thereof. Adjustable linkage varies the length of the stroke of the displacers, thereby controlling the pressure changes within a power cylinder during a cycle of operation and providing quick response to desired changes in power output of the engine.

The engine of the invention includes power pistons disposed for reciprocating movement within power cylinders, each power piston being connected by a connecting rod and a lever to a power piston rocker shaft, which in turn is connected, by another lever and a connecting link, to an eccentric crank journal of an output crankshaft. The relationship between lever lengths and crankshaft crank throw distance allows only oscillating rotation of the power piston rocker shaft.

In one embodiment of the invention a pair of interconnected displacers are disposed for reciprocating motion within respective displacer cylinders. The displacers are moved within the cylinders by a connecting rod driven by a lever arm mounted fixedly on an oscillating displacer rocker shaft, and their motion transfers a working fluid through a heat exchanger unit which imparts thermal energy to the working fluid for use in the power piston cylinder.

A lever in the linkage between the power piston rocker shaft and the displacer rocker shaft is variable in its effective length. For example, the variable length lever may be a slide in which a connecting pin is disposed for movement toward or away from the axis of rotation of the lever, which is made to oscillate as the engine operates. In order to provide for reversibility of the engine, such a slide extends in opposite directions away from its pivot point.

A connecting link extends between the variable length lever arm of the power piston rocker shaft and a displacer drive lever arm of fixed length attached to the displacer rocker shaft, so that the displacer rocker shaft oscillates through an angle which increases with increasing effective length of the variable length lever arm.

A control linkage, for example a slotted yoke whose slot extends generally transverse to the variable length lever arm in the midpoint of its oscillation, controls the effective lever arm length of the variable length lever arm attached to the power piston rocker shaft, for example by moving the connecting pin in the previously mentioned slide.

As a result, when the effective length of the lever arm is reduced, the amount of gas displaced between the heated and cooled ends of the heat exchanging unit is reduced, thereby reducing the amount of energy carried into the power piston cylinders. When the effective direction of the variable length lever is reversed, as by moving the connecting pin along the slide to the opposite side of the power rocker shaft, the phase relationship, between the power rocker shaft and the displacers driven thereby, is reversed, reversing the rotation of the engine.

Since the rocker shafts of the engine rotate through only a limited angle, it is possible to provide an improved shaft seal at the point at which each rocker shaft extends through the casing of the engine, and to thereby positively seal the working fluid within the interior of the engine casing. The shaft seal of the invention comprises a sleeve of flexible and elastically resilient material which surrounds a portion of the shaft near the engine casing wall through which it extends. Flanges extending radially from the respective ends of the elastic sleeve permit tight connection to the interior of the engine casing and to an annular flange portion of the shaft. Within the sleeve, and surrounding the shaft, a plurality of washer-like spacers are provided to support the seal against the pressure from the outside of the sleeve, while permitting movement of the shaft relative to the engine casing.

It is therefore a primary objective of the present invention to provide an improved Stirling cycle engine whose power output direction is reversible.

It is another important objective of the present invention to provide a control system for a Stirling cycle engine of the type utilizing displacers to move a working fluid through a heat exchanger unit.

It is a further objective of the present invention to provide a seal usable to maintain pressure within the engine casing of a Stirling cycle engine, at a point where an oscillating shaft extends through the casing.

It is a principal features of the present invention that it provides a control yoke and linkage for controlling the length of the stroke of the displacers of a Stirling cycle engine while the length of the stroke of the power pistons remains constant.

It is another important feature of the present invention that it provides a shaft seal including a flexible elastic tube and a plurality of relatively movable supporting spacers, for providing a positive seal between an oscillating shaft and a wall through which the shaft extends.

It is a principal advantage of the present invention that it provides a Stirling cycle engine which is more responsive to desired changes in power and speed than previously known Stirling cycle engines.

It is another important advantage of the present invention that it provides a Stirling cycle engine whose direction of rotation may be reversed without modification of the engine's construction.

It is yet another advantage of the present invention that it provides a shaft seal which reduces the amount of leakage of a working fluid from within the engine of the invention.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figures 1, 2, 3, 8, 9:
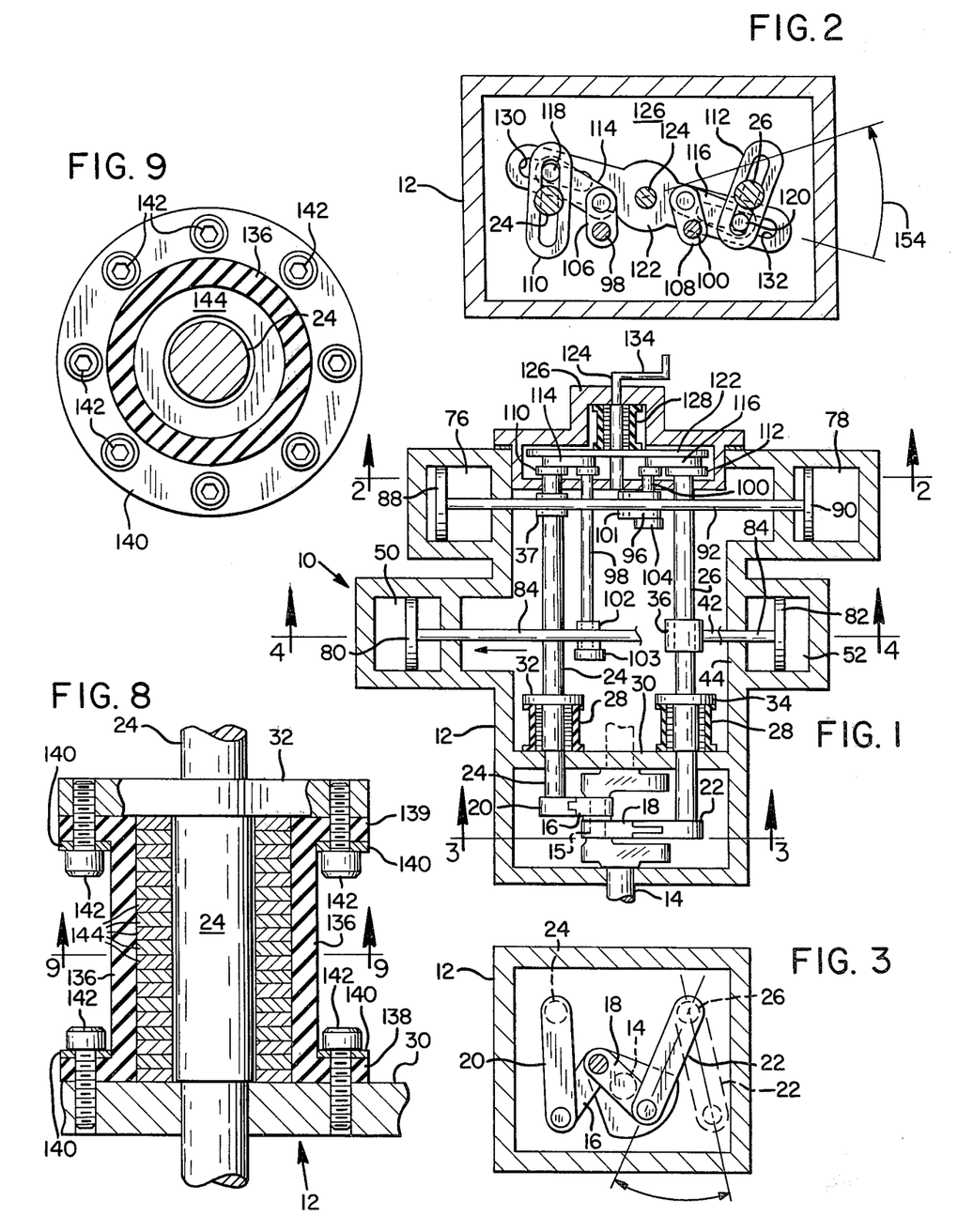
FIG. 1 is a sectional top view of a Stirling cycle engine embodying the present invention.
FIG. 2 is a sectional detail view, at an enlarged scale, of the engine of FIG. 1, taken along line 2—2.
FIG. 3 is a sectional detailed view, at an enlarged scale, of the engine of FIG. 1, taken along line 3—3.
FIG. 8 is a sectional view, at an enlarged scale, of a shaft seal which is a part of the engine shown in FIG. 1.
FIG. 9 is a sectional view, at an enlarged scale, of the shaft seal shown in FIG. 8, taken along line 9—9.

An exemplary Stirling cycle engine 10 embodying the control system of the present invention is shown in FIGS. 1–7 of the drawings. Referring first to FIG. 1, the engine 10 may be seen to comprise an engine casing 12. An output crankshaft 14 has attached thereto a pair of crankshaft connecting links 16 and 18. One end of each link 16 and 18 is pivotably connected to a single eccentric journal 15 of the crankshaft 14, while the opposite ends of the respective connecting links are pivotably connected, respectively, to power piston rocker shaft levers 20 and 22, which are fixedly attached to respective power piston rocker shafts 24 and 26. Because of their respective locations relative to the crankshaft 14, the power piston rocker shafts oscillate about 90° out of phase with one another.

The power piston rocker shafts 24 and 26 extend through respective openings in the engine casing 12, the openings being sealed around the power piston rocker shafts 24 and 26 by provision of pressure seals 28. One end of each seal 28 is connected to an inner surface 30 of the engine casing, while the opposite end is connected to a respective flange 32 or 34 extending radially from the respective power piston rocker shaft 24 or 26.

A power piston lever or crank arm 36 is connected to the power piston rocker shaft 26, and a similar power piston crank arm 37 is connected to the power piston rocker shaft 24 for oscillating rotation therewith. As shown in FIGS. 4–7, a slotted yoke 38 may be provided in the lower end of the power piston crank arm 36, to receive a T-head 40 of a power piston connecting rod 42. The connecting rod 42 extends slidably and sealingly through an aperture in an interior wall 44 of the casing 12 and is connected fixedly to a power piston 46 disposed slidably within a power piston cylinder 48.

A pair of displacer cylinders 50 and 52 are associated with the power piston cylinder 48. The ends 48a and 48b of the interior of the power piston cylinder 48 communicate respectively with the ends 52a and 52b of the interior of the displacer cylinder 52 by means of a pair of passageways 54 and 56. A pair of conduits 58 and 60 also interconnect respective ends of the interior of the displacer cylinder 52 with a heat exchanger unit 62.

The heat exchanger unit 62 comprises a cooler 64, a heater 66, and a regenerator 68 interconnecting the heater and the cooler and permitting flow of a working fluid therethrough. The heat exchanger unit 62 also includes a cooler 65, a heater 67, and a regenerator 69 interconnected similarly with one another. Conduits 70 and 72 interconnect the heaters 66 and 67 of the heat exchanger unit 62 respectively with ends 50a and 50b of the displacer cylinder 50. The heat exchanger components may be of conventional design, the heaters including thermostatic controls to assure provision of heat energy to the system without burning out the components. Each regenerator 68 or 69 contains material which quickly absorbs heat from fluid passing therethrough at an elevated temperature and can quickly discharge heat into a fluid passing therethrough at an initially depressed temperature, thereby temporarily storing significant quantities of heat as the working fluid is passed in alternating directions through the regenerator 68 or 69.

A pair of displacer cylinders 76 and 78 (FIG. 1) are associated with the other power piston cylinder and its power piston (not shown), which is linked to the power piston rocker shaft 24 in the same manner as the linkage of the power piston 46 with its rocker shaft 26. A heat exchanger unit (not shown), similar to the heat exchanger unit 62, is associated with the displacer cylinders 76 and 78.

A pair of displacer pistons 80 and 82, interconnected by a displacer connecting rod 84, are disposed slidably within the displacer cylinders 50 and 52, with the displacer connector rod 84 extending slidably through suitably sealed apertures in the respective inner ends 50a and 52a of the displacer cylinders. Likewise, a pair of displacer pistons 88 and 90 are slidably disposed within the displacer cylinders 76 and 78, and are interconnected with one another by a displacer connecting rod 92.

The respective displacer connecting rods 84 and 92 are moved by displacer levers 94 and 96, which are fixedly attached to respective displacer rocker shafts 98 and 100. An upper end of the displacer lever 94 is connected by a slotted fork 102 to a suitable lug fixed on the displacer connecting rod 84. A fork 101 similarly connects the displacer lever 96 to the displacer connecting rod 92. Respective support bearings 103 and 104 are provided for one end of each displacer rocker shaft 98 or 100, while the opposite ends extend to the wall of the engine casing 12, adjacent to an end of the power rocker shafts 24 and 26. Displacer rocker shaft drive levers 106 and 108 are fixedly attached to the displacer rocker shafts 98 and 100.

At the neighboring end of each of the respective power piston rocker shafts 24 and 26 are output slides 110 and 112, each mounted perpendicularly across the end of the respective power piston rocker shaft 24 or 26 and extending in both directions therefrom. Displacer drive links 114 and 116 are pivotably connected to the displacer rocker shaft drive levers 106 and 108, and are connected to the respective output slide 110 or 112 by means of respective connecting pins 118 and 120 which extend slidably into the output slides 110 and 112.

A control yoke 122 is mounted on a control shaft 124 extending through the end wall 126 of the casing 12, and a seal 128, similar to the seals 28, is provided where the control shaft 124 extends through the end wall 126. The control yoke 122 extends perpendicularly from the control shaft 124, and includes control slides 130 and 132, located on opposite sides of the control shaft 124, into which the connecting pins 118 and 120 extend. Suitable apparatus such as a control lever 134 is provided on the exterior of the engine casing 12 to permit rotation of the control shaft 124, and consequent movement of the control yoke 122 and control slides 130 and 132 to thereby control the speed of operation of the engine.

Referring now particularly to FIGS. 8 and 9, it may be seen that the seals 28 and 128 each comprise a flexible elastic sleeve 136 which extends surroundingly along a portion of the respective shaft (e.g. power piston rocker shaft 24) whose penetration through a wall of the engine casing must be sealed. An annular flange 138 is provided at each end of the sleeve 136, and means such as a backing ring 140 and screws 142 are provided to connect the flanges 138 sealingly to the inner surface 30, the flange 32 or 34, or the control yoke 122.

Figures 6, 7, 10:
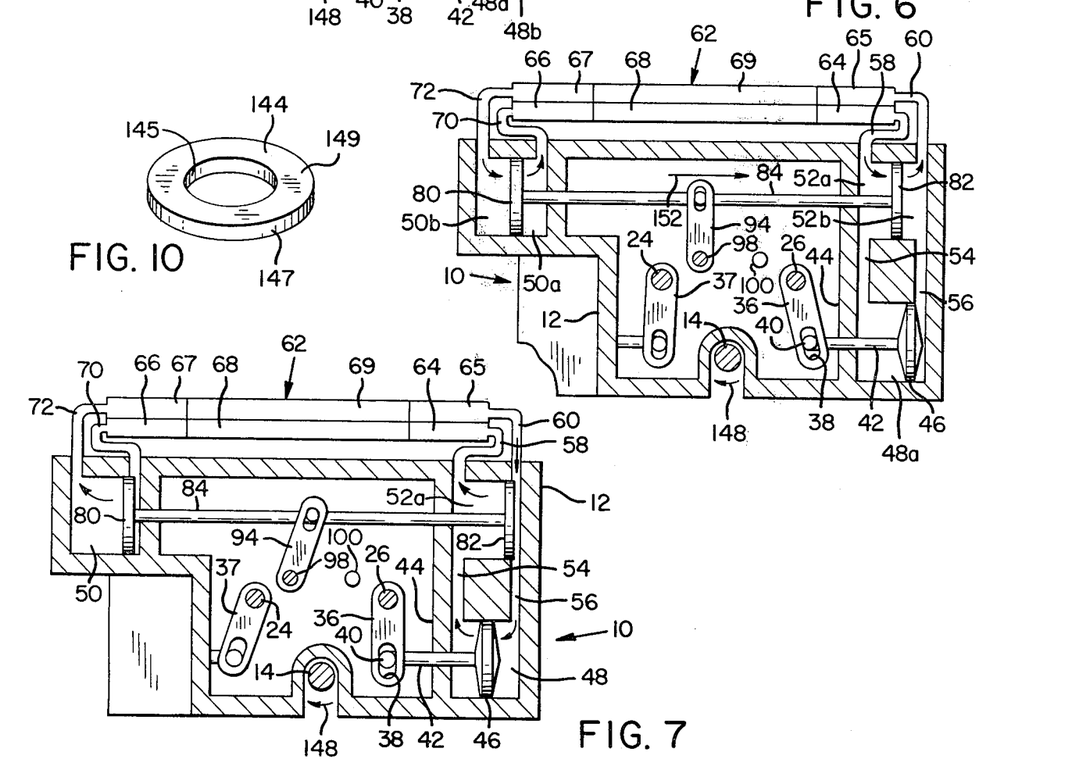
FIG. 6 is a partially schematic sectional view of the engine shown in FIG. 1, taken along line 4—4, showing one of the power pistons at the right end of a power stroke.
FIG. 7 is a partially schematic sectional view of the engine shown in FIG. 1, taken along line 4—4, showing one of the power pistons in the middle of a stroke toward the left.
FIG. 10 is a pictorial view, at an enlarged scale, of a spacer member which is a part of the shaft seal shown in FIG. 8.

Located within the sleeve 136, and surrounding the respective shaft, are a plurality of annular washer-like spacers 144 of a suitably strong and durable material, for example a metal of softer composition than the shaft. Each spacer 144 is provided with smooth interior and exterior circumferential surfaces 145 and 147 to avoid frictionally wearing away the material of the sleeve 136 or the shaft 24, and each spacer is thick enough between its flat side surfaces 149, for example about 1/32 inch, to avoid cutting the sleeve 136. On the other hand, each spacer 144 is thin enough to allow substantial twisting of the sleeve 136 to be accommodated by slippage of the spacer relative to one another without significant motion of each spacer 144 relative to the adjacent interior surface of the sleeve 136. Suitable lubricating material is provided on the surfaces of the spacers 144 to permit the spacers and sleeve to move relative to one another and to the shaft surfaces.

Preferably the working fluid in the cylinders, the heat exchanger units 62 and the interconnecting conduits of the engine 10 is highly pressurized, having an exemplary average pressure of 1500 psig. Use of seals 28 and 128 permits the interior of the engine casing 12 also to be pressurized, reducing the pressure differential between opposite sides of seals (not shown) in the ends of the displacer cylinders 50-53 and power cylinders 48 and 49, through which the connecting rods 40, 42, 84 and 92 slide.

Figures 4, 5:
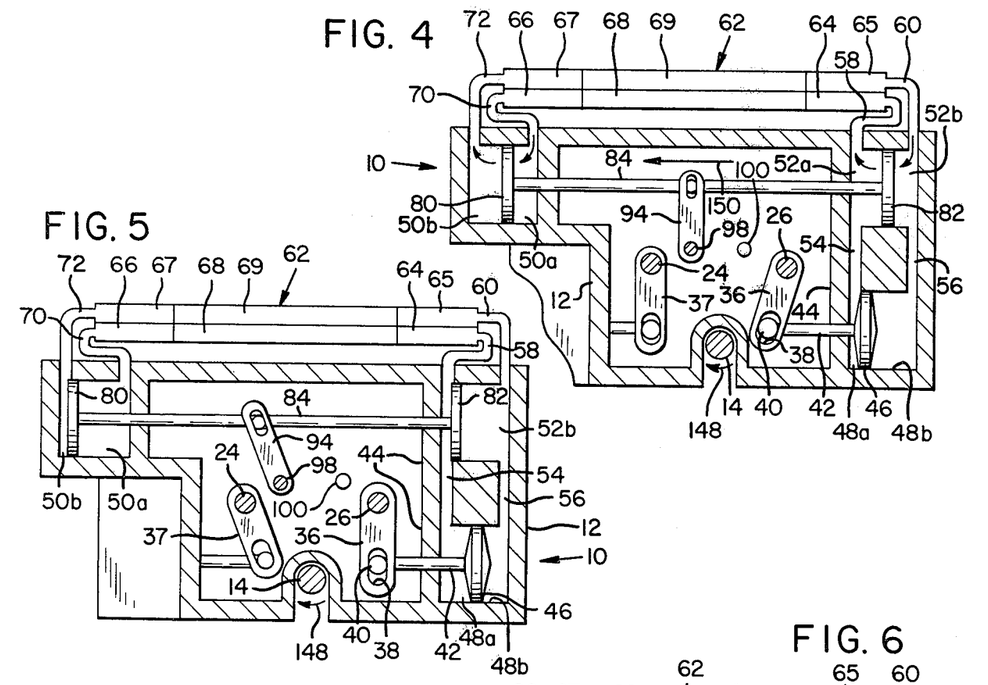
FIG. 4 is a partially schematic sectional view of the engine of FIG. 1, taken along line 4—4, showing one of the power pistons at the left end of a stroke.
FIG. 5 is a partially schematic sectional view of the engine of FIG. 1, taken along line 4—4, showing one of the power pistons in the middle of a power stroke toward the right.

Operation of the engine can best be understood having reference to FIGS. 4-7, showing the power cylinder 48 and power piston 46, and the associated pair of displacer cylinders 50 and 52 and displacer pistons 80 and 82. With the crankshaft 14 rotating in the direction of the arrow 148, the forward direction of rotation of the engine, the control yoke 122 is in the position shown in FIG. 2. As shown in FIG. 4, the power piston 46 has just reached the left end 48a of the power cylinder 48, and the displacer lever 94 is forcing the displacer connecting rod 84 to the left as indicated by the arrow 150. Within the volume defined by the displacer cylinders 50 and 52, the power cylinder 48, the heat exchanger unit 62, and the interconnecting conduits and passageways 54, 56, 58, 60, 70, and 72, a compressible working fluid, such as a pressurized gas, is moved through the heat exchanger unit 62 by motion of the displacer pistons 80 and 82. As the displacer pistons 80 and 82 move to the left, the pressure increases in the inner ends 50a and 52a of the displacer cylinders 50 and 52 and the inner end 48a of the power cylinder 48, as heat is added to the fluid by the regenerator 68 and heater 66. Simultaneously the pressure decreases in the outer ends 50b and 52b of the displacer cylinders 50 and 52 and the outer end 48b of the power cylinder 48, as heat is removed from the working fluid by the cooler 65 and regenerator 69.

As the cycle continues to the point shown in FIG. 5, where the displacer pistons 80 and 82 have progressed to the left extremity of their travel, the pressure increase in the inner ends 52a and 48a of the displacer cylinder 52 and power cylinder 48 has caused the power piston 46 to move toward the right to approximately the middle of its stroke, and the working fluid has been forced from the outer end 50b of the displacer cylinder 50 into the heater 67 of the heat exchanger 62. Some of the working fluid is then displaced from the heater 67 into the regenerator 69, where heat is extracted from the working fluid, and further into the cooler 65. This in turn displaces fluid through the conduit 60, into the outer end 52b of the displacer cylinder 52, the removal of heat causing pressure to decrease in the displacer cylinder outer end 52b. This pressure decrease extends also into the outer end 48b of the power cylinder 48, the higher pressure in the inner end 48a then driving power piston 46 into the outer end 48b.

As the cycle continues to the stage shown in FIG. 6 the displacer lever 94 forces the displacer pistons 80 and 82 to the right, as indicated by the arrow 152, beginning to increase the pressure in the outer ends 50b and 52b of the displacer cylinders 50 and 52, while decreasing the pressure in the inner ends 50a and 52a. At this time the pressures in the inner and outer ends of the displacer cylinders 50 and 52 and the inner and outer ends 48a and 48b of the power cylinder 48 are approximately equalized. As the power piston crank arm 36 moves the power piston 46 toward the inner end 48a and the displacers 80 and 82 move further toward the inner end 50a and outer end 52b, respectively, heated working fluid is moved from the inner end 50a through the heater 66, regenerator 68, and cooler 64 to the inner end 52a, being cooled and decreasing in pressure during this movement. Simultaneously, cooled working fluid is displaced from outer end 52b through the cooler 65, regenerator 69 and heater 67 to the outer end 50b, being heated and increasing in pressure. This increasing differential pressure moves the power piston 46 back toward the inner end 48a, toward the position shown in FIG. 7.

In FIG. 7 the power piston 46 is moving leftward, while the displacer pistons 80 and 82 have reached the right-hand limit of their motion and the displacer lever 94 is about to force the displacer pistons 80 and 82 to move leftward again. This interrelationship of the motion of the power rocker shaft 26, power piston crank arm 36, displacer rocker shaft 98, displacer lever 94, and displacer pistons 80 and 82 is established by the interconnection between the output slide 110 and the displacer rocker shaft drive lever 106. The power output slide 110 is, in turn, caused to oscillate with the power piston rocker shaft 24, in response to rotation of the crankshaft 14 to which the power rocker shaft 24 is connected by the power piston rocker shaft lever 20 and crankshaft connecting link 16. This linkage creates a ninety degree phase difference between movement of the displacer and corresponding following movement of the power piston.

The timing and length of stroke of the displacer pistons is established, for either a forward or a reverse engine rotation, by the position of the control yoke 122. The connecting pins 118 and 120 are moved by oscillation of the respective output slides 110 and 112, but are restricted by the control slides 132 and 130. Thus when the control arm 122 is rotated so that the control slides 130 and 132 intersect the central axis of the power piston rocker shafts 24 and 26, there is no resultant motion of the displacer pistons. When the control yoke 122 is rotated to its maximum counter-clockwise position as indicated by the arrow 154 in FIG. 2, the timing of the displacer pistons is reversed relative to the motion of the power pistons, causing the engine to rotate in the opposite direction.

Positioning the control yoke 122 between its limiting forward and reverse positions brings about a shortened stroke of the displacer pistons 80, 82, 88 and 90. Since the connecting pins 118 and 120 are guided by the slides 130 and 132, they are held closer to the center of the respective power piston rocker shafts 24 and 26. The connecting pins 118 and 120 therefore move through a shorter distance when the control arm 122 is not in one of its limiting positions, although the power piston rocker shafts 24 and 26 oscillate through the same angle with each rotation of the crank shaft 14 regardless of the position of the control yoke 122.

When the displacers 80, 82, 88, and 90 move a reduced distance, they naturally displace a smaller amount of working fluid through the respective elements of the heat exchanger unit 62. The result is that a smaller amount of energy is transferred to the power piston cylinders to move the power pistons and thereby rotate the crank shaft 14.

Because the effect of moving the control yoke 122 is to immediately change the stroke length of the displacers 80, 82, 88, and 90 within their cylinders, the amount of energy transferred to the power pistons is immediately reduced or increased, depending upon the direction in which the control shaft 124 is rotated, bringing about a very rapid change in the power available to the power pistons. This method of control has the advantage that it does not depend upon the rate of change of heat available in the heater portions of the heat exchange unit 62. The engine embodying the control system of the present invention is therefore more quickly responsive to desired changes in output.

Referring now to FIGS. 11-15, a Stirling cycle engine 160 which is an alternative embodiment of the present invention is shown in sectional view. The engine 160 includes a pair of power pistons 162 and 164 linked by connecting rods to a power piston rocker arm 166 mounted on a power piston rocker shaft 168 for oscillation therewith. The power pistons 162 and 164 are fitted for reciprocating movement within respective power cylinders 170 and 172.

Figure 11:
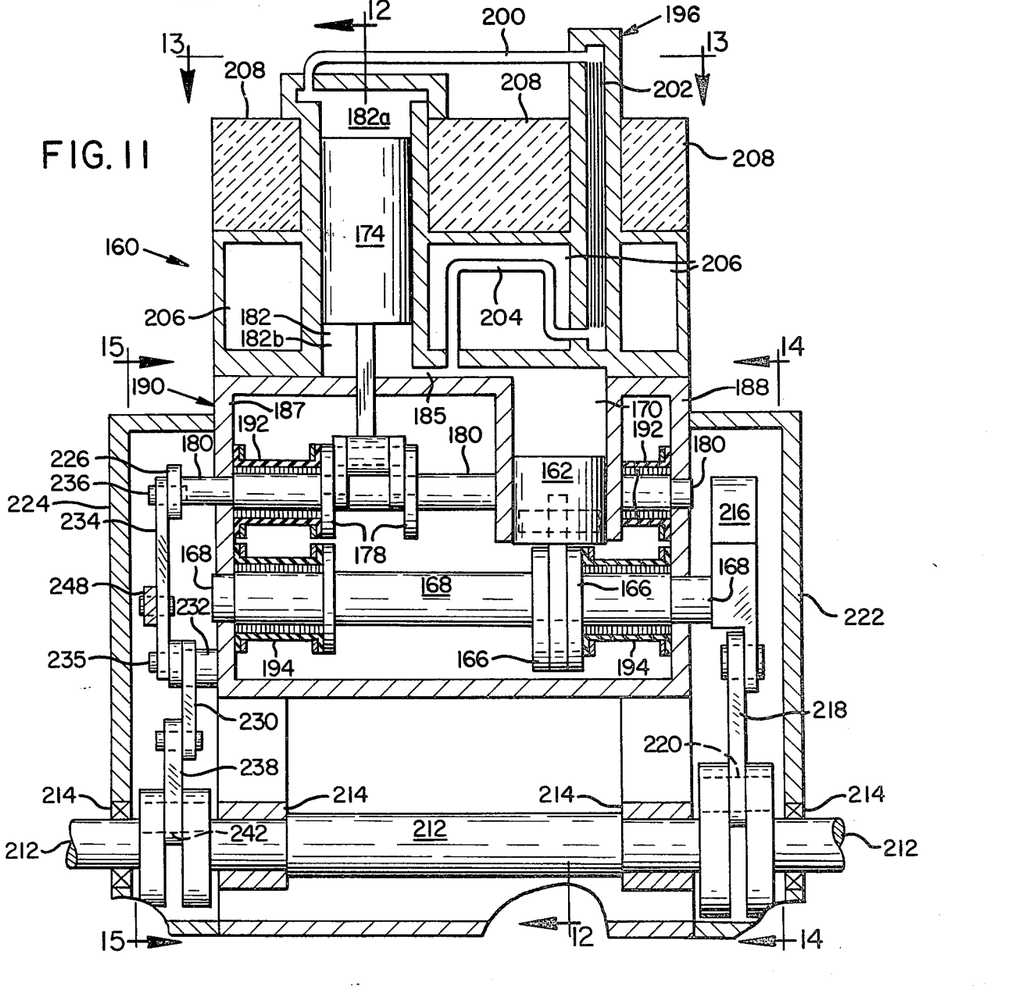
FIG. 11 is a partially schematic sectional view of a Stirling cycle engine which is an alternative embodiment of the present invention.
Figure 12:
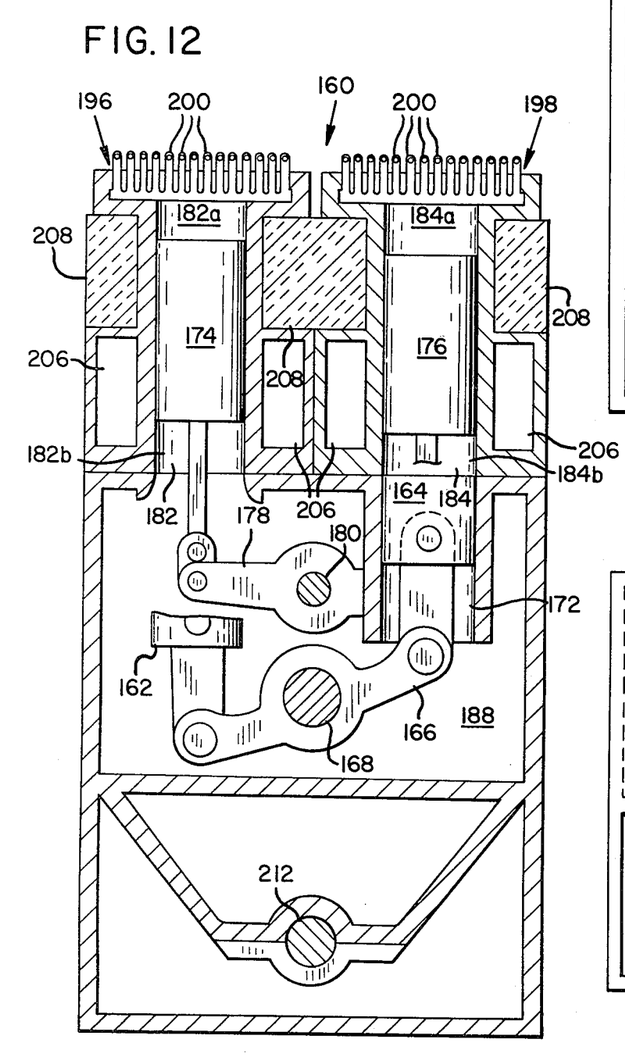
FIG. 12 is a partially schematic view of the engine shown in FIG. 11, taken along line 12—12.
Figure 13:
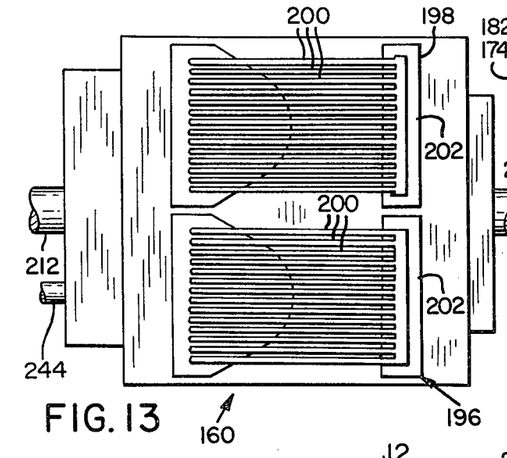
FIG. 13 is a plan view of the engine shown in FIG. 11, at a reduced scale.

A pair of displacers 174 and 176 are linked to a displacer rocker arm 178 which is fixed for oscillation with a displacer rocker shaft 180 which may be located above the power rocker shaft 168. The displacers 174 and 176 are fitted for reciprocation within displacer cylinders 182 and 184 in response to oscillation of the displacer rocker shaft 180. The displacer separate the respective cylinders 182 and 184 into upper chambers 182a and 184a, and lower chambers 182b and 184b. A passageway 185 interconnects the interior of the power cylinder 170 with the interior of the lower chamber 182b, and a similar passageway interconnects the power cylinder 172 and the lower chamber 184b.

The power piston rocker shaft 168 and displacer rocker shaft 180 both extend through the walls 187 and 188 of an internally pressurized casing 190 to which the power cylinders 170 and 172 and the displacer cylinders 182 and 185 are sealingly connected. Suitable bearings (not shown) are provided to support axial and radial loads. At the locations where the displacer rocker shaft 180 extends through the walls 187 and 188 seals 192 are provided to retain pressure within the engine casing 190. Similar seals 194 are provided where the power piston rocker shaft 168 extends through the walls 187 and 188. The seals 192 and 194 are similar to the seals 28 and 128 in the previously described embodiment of the invention, and will therefore not be described in detail here.

Interconnecting the interior of the power cylinder 170 and the displacer cylinder 182, and similarly interconnecting the interior of the power cylinder 172 and displacer cylinder 184, are a pair of heat exchanger units 196 and 198. Each heat exchanger unit comprises a plurality of heated tubes 200, a regenerator section 202, and a plurality of cooled tubes 204. One end of each of the heated tubes 200 opens into the interior of a respective displacer cylinder 182 or 184 while the opposite end of each of the heated tube sections 200 opens into one end of the respective regenerator section 202. Similarly, the cooled tubes 204 interconnect the interior of the respective passageway 185 with the opposite end of the regenerator section 202. Each power cylinder and the associated displacer cylinder and heat exchanger unit thus form a substantially sealed, variable volume system.

A heat source, such as a fuel burner (not shown), provides heat to the exterior of the heated tubes 200, and is preferably thermostatically controlled. Each of the cooled tubes 204 is surrounded by a coolant such as a liquid circulated through passageways 206 surrounding the exterior of the lower portion of the displacer cylinders 170 and 172, and preferably connected with a heat sink such as a radiator (not shown).

Thermal insulation material 208 is provided surrounding the upper portions of the displacer cylinders 182 and 184, and may also be provided surrounding the power piston cylinders 170 and 172.

Figure 14:
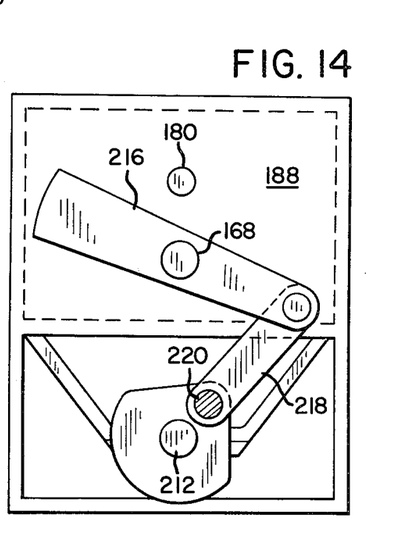
FIG. 14 is a sectional view, at a reduced scale, of the engine shown in FIG. 11, showing the power output crankshaft driving linkage, taken along line 14—14.

A power output crankshaft 212 is supported in suitable bearings 214 mounted below the power rocker shaft 168, and preferably outside the pressurized engine casing 190. Referring now also to FIG. 14, it may be seen that the power output crankshaft 212 is driven by a power piston rocker shaft lever 216 fixedly mounted on the power rocker shaft 168 and connected through a connecting link 218 to an eccentric journal 220 on the power output crankshaft 212. As may be seen most clearly in FIG. 14, the power rocker shaft 216 and the eccentric journal 220 are preferably provided with appropriate counterweights. A casing 222 is preferably provided to house this interconnection between the power rocker shaft 168 and the power output crankshaft 212.

Figure 15:
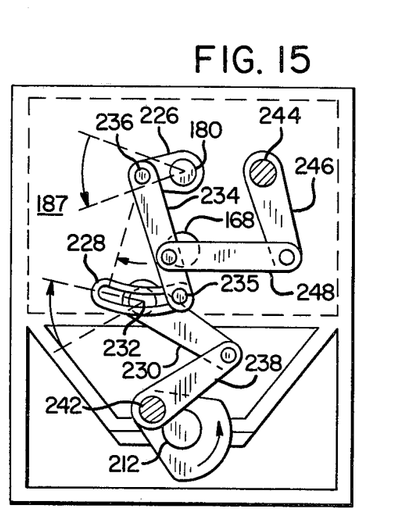
FIG. 15 is a sectional view, at a reduced scale, of the engine shown in FIG. 11, showing the control linkages, taken along line 15—15.

Located at the opposite end of the engine 160 another casing 224 is provided to enclose displacer rocker shaft control and drive linkages. A displacer rocker shaft drive lever 226 is fixedly attached to the end of the displacer rocker shaft 180 within the casing 224. An arcuate displacer drive slide 228 is fixedly attached to a displacer drive slide lever 230 for rotation therewith about a displacer drive lever pivot shaft 232 which is fixedly mounted on the exterior of the casing 190.

A displacer drive link 234 extends between the displacer drive slide 228, to which its lower end is connected by a slidably engaged pivot pin 235, and a pivot bearing 236 located on the displacer rocker shaft drive lever 226. A displacer drive lever connecting rod 238 interconnects a lever bearing 240 located at the lower end of the displacer drive slide lever 230 with a second eccentric journal 242 included in the power output crankshaft 212.

A control shaft 244 extends outwardly through the casing 224 and a control lever 246 is fixedly attached to the control shaft 244 within the casing 224. A control link 248 interconnects the control lever 246 with the displacer drive link 234 so that rotation of the control shaft 244 adjusts the position of the pivot pin 235 of the displacer drive link 234 in the displacer drive slide 228.

The relative positions of the power piston rocker shaft lever 216, the eccentric journals 220 and 242, the displacer drive slide lever 230, displacer drive slide 228, and the displacer rocker shaft drive lever 226 provide approximately a 90° phase difference between power piston and displacer motion, the direction of the phase difference depending on the position of the pivot pin 235 in the slide 228.

Operation of the engine 160 is similar to operation of the first described engine 10, as may be seen in FIGS. 16–19, showing the relative positions of the displacer 174 and the power piston 162 at four different points in the rotation of the power output crankshaft 212 through an entire revolution. The motion of the power piston 164 and displacer 176 is similar but out of phase by a half revolution of the power output crankshaft 212.

Figures 16, 17, 18, 19:
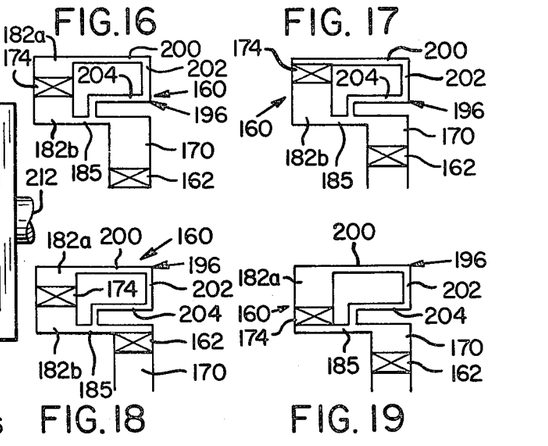
FIGS. 16–19 are schematic sectional views of the engine shown in FIG. 11, showing the positions of one power piston and the related displacer at four different phases of one cycle of operation.

As shown in FIG. 16, displacer 174 is half way through its upward stroke and power piston 162 is at the end of its downward stroke. A working fluid such as a compressible gas is substantially sealed within the displacer cylinder 182, power cylinder 170 and the interconnecting heat exchanger unit 196. As the working fluid is forced through the heated tubes 200, the regenerator 202, cooled tubes 204 and passageway 185 into the lower chamber 182b of the displacer cylinder, the mean pressure of the working fluid decreases.

Continuing, as shown in FIG. 17, the displacer 174 moves to the top of its stroke, forcing most of the working fluid through the heated tubes 200 of the heat exchanger unit 196 and into the relatively cool end of the enclosed volume of the engine, further reducing the mean pressure of the working fluid. As a result the power piston 162 moves upward into the power piston cylinder 170, under influence of the pressure within the engine casing 190.

In FIG. 18, the power piston 162 has reached the top of its stroke, and the displacer 174, moved by the linkages described above, is half way through its downward stroke, pulling working fluid into the upper chamber 182a at the relatively hot end of the engine's working fluid containing volume, where heat transferred to the working fluid by the heated tubes 200 and the regenerator 202 increases the mean pressure of the working fluid enclosed in the system.

Finally, in FIG. 19, the displacer 174 has reached the end of its downwaard stroke, drawing more working fluid into the hot end of the system and further increasing the mean pressure of the working fluid within the system. At this point the increased pressure of the working fluid has driven the power piston 162 half way through its downward stroke.

As the control shaft 244 is rotated to displace the pivot pin 235 of the displacer drive link 234 toward the central portion of the displacer drive slide 228, the length of the stroke of the displacer 174 decreases, so that it would be located at the position shown in FIGS. 16 and 18 when the displacer drive link 234 is in its central position. As in the previously described engine 10, this condition results in stoppage of the engine 160.

Further rotation of the control shaft 244 in the same direction forces the pivot pin 235 of the displacer drive link 234 toward the opposite end of the displacer drive slide 228, reversing the phase relationship between the power piston and the respective displacer, thus causing the engine to operate in the opposite direction of rotation.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A seal for preventing passage of a fluid between the interior of an opening of a wall and the surface of a shaft extending through said opening, said shaft having an annular flange extending radially therefrom, the seal comprising:
    (a) a flexible elastic tubular member having first and second ends and an interior diameter greater than the exterior diameter of said shaft;
    (b) first and second attachment means for attaching said first and second ends respectively to said wall and to said annular flange; and
    (c) a plurality of annular spacer members each having an outer diameter which is no greater than the interior diameter of said tubular member and an interior diameter which is no less than the exterior diameter of said shaft, the number of said spacer members being sufficient to substantially fill the interior of said sleeve between said first and second attachment means.

2. The seal of claim 1, each said spacer being at least about 1/32 inch in thickness.

* * * * *